No. 648,695. Patented May 1, 1900.
J. KRONE.
VALVE FOR FLUID PRESSURE APPARATUS.
(Application filed Nov. 22, 1899.)
(No Model.) 3 Sheets—Sheet 1.

Witnesses:
Geo. W. Eisenhaur.
R. B. Bloemcke.

Inventor:
Johannes Krone,
by A. Faber du Faur
Attorney.

No. 648,695. Patented May 1, 1900.
J. KRONE.
VALVE FOR FLUID PRESSURE APPARATUS.
(Application filed Nov. 22, 1899.)
(No Model.) 3 Sheets—Sheet 2.

Witnesses:
Geo. W. Eisenbrau
R. B. Blosneke

Inventor:
Johannes Krone,
by A. Faber du Faur
Attorney.

No. 648,695. Patented May 1, 1900.
J. KRONE.
VALVE FOR FLUID PRESSURE APPARATUS.
(Application filed Nov. 22, 1899.)
(No Model.) 3 Sheets—Sheet 3.

Witnesses:
Geo. W. Eisenbraun
R. B. Blosmcke

Inventor:
Johannes Krone,
by A. Faberd...
Attorney.

UNITED STATES PATENT OFFICE.

JOHANNES KRONE, OF ESSEN, GERMANY, ASSIGNOR TO FRIED. KRUPP, OF SAME PLACE.

VALVE FOR FLUID-PRESSURE APPARATUS.

SPECIFICATION forming part of Letters Patent No. 648,695, dated May 1, 1900.

Application filed November 22, 1899. Serial No. 737,848. (No model.)

*To all whom it may concern:*

Be it known that I, JOHANNES KRONE, engineer, a citizen of the German Empire, residing at Essen, Germany, have invented certain new and useful Improvements in Valves for Fluid-Pressure Apparatus, of which the following is a specification.

In hydraulic or fluid pressure apparatus the moving of the valves for regulating the admission and discharge of fluid generally requires considerable force when fluid under high pressure is used. This is a serious inconvenience, particularly in hydraulic apparatus, where it is desirable to be able to actuate the valve by hand.

My invention has reference to an oscillating slide-valve the easy and exact motion of which is obtained by actuating the main valve by water-power, which latter is brought into action through a small auxiliary valve actuated by hand for opening and closing the ports of the motor actuating the main valve.

The nature of my invention will best be understood when described in connection with the annexed drawings, illustrating a four-way valve-gear for hydraulic motors embodying my invention.

Figure 1:
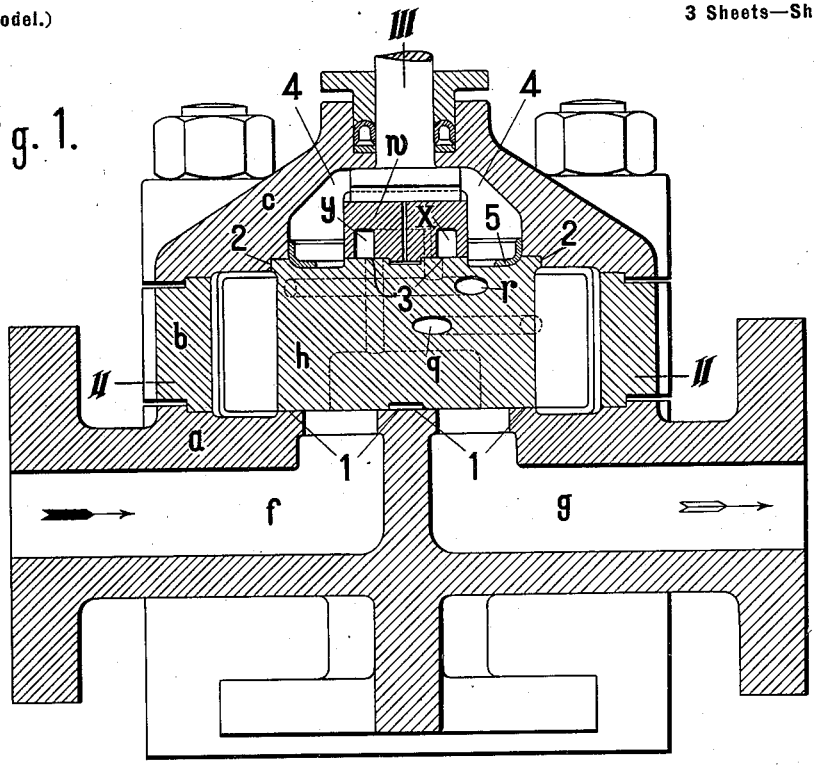
Figure 2:
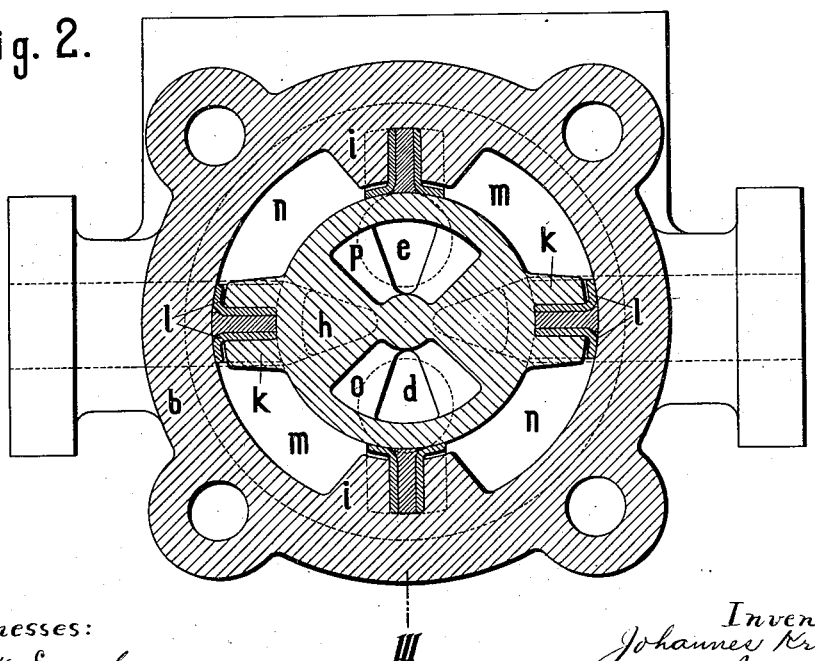
Figure 3:
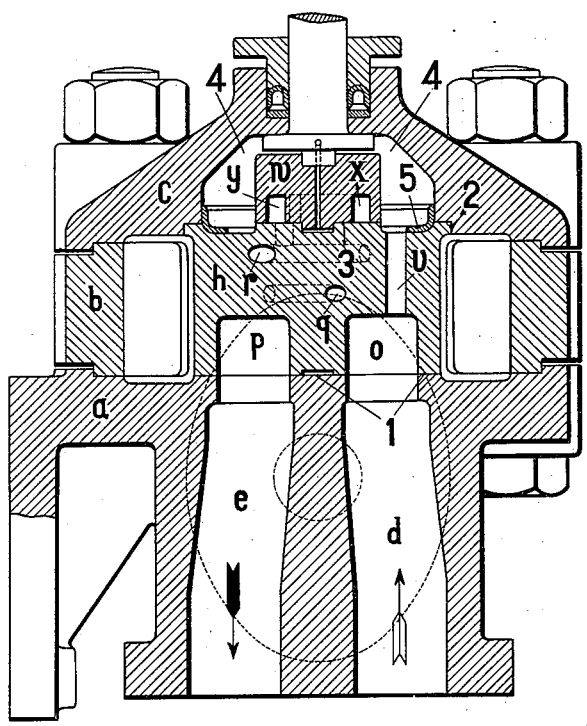
Figure 4:
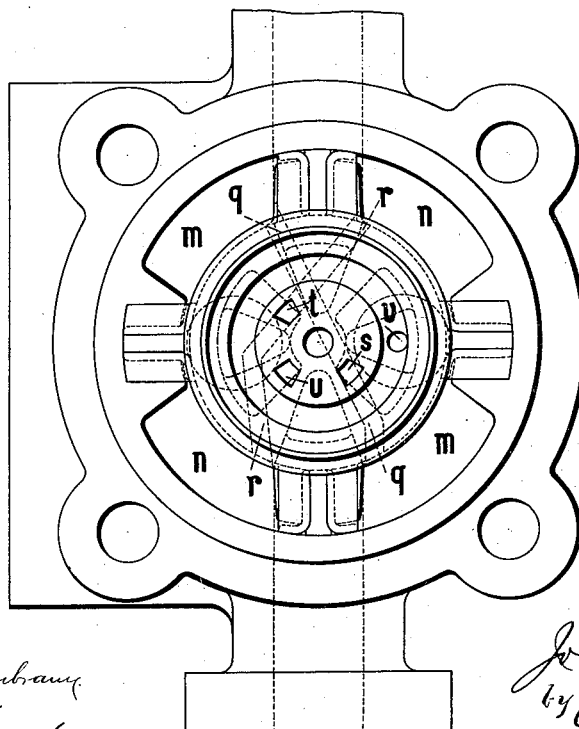
Figure 6:
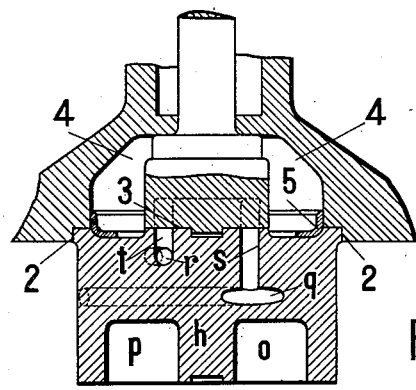
Figure 7:
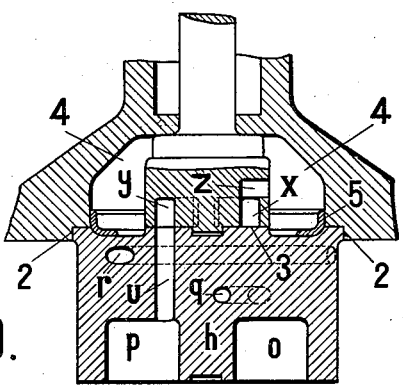
Figure 10:
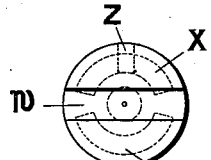
Figure 9:
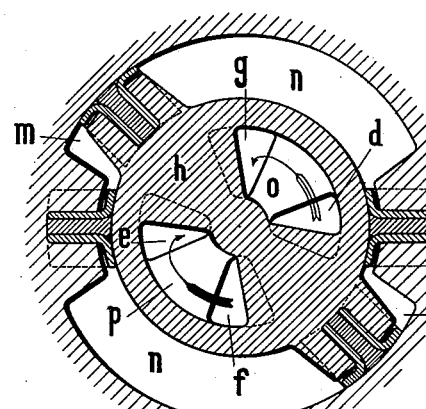
Figure 8:
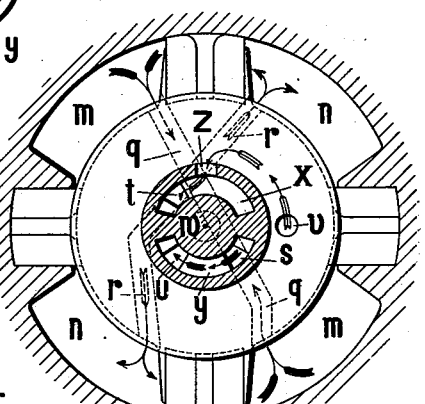
Figure 5:
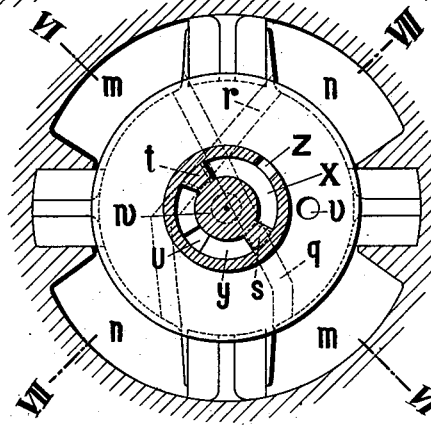

In the drawings, Figure 1 represents a longitudinal vertical section of the four-way oscillating slide-valve in the position of rest. Fig. 2 is a horizontal section on the line II II of Fig. 1; Fig. 3, a vertical section on the line III III of Figs. 1 and 2; Fig. 4, a plan view of the oscillating valve in the position of rest, the upper part of the casing and the auxiliary valve being removed; Fig. 5, a plan view of the main valve and of the auxiliary oscillating slide-valve, the latter in section, both in the position of rest; Fig. 6, a vertical section through both slide-valves on the line VI VI, Fig. 5; Fig. 7, a similar section on the line VII VII, Fig. 5; Fig. 8, a plan view showing the main valve in the position of rest and the auxiliary valve in horizontal section turned to the left from the position of rest; Fig. 9, a horizontal section of the main valve in a position turned to the left from the position Fig. 8; Fig. 10, a plan view of the auxiliary valve.

Similar letters and figures designate corresponding parts throughout the several views of the drawings.

In the drawings the valve-casing is shown constructed of three parts—namely, a lower part $a$, a middle part $b$, and a top $c$, the three parts being connected by screw-bolts. The lower part $a$ of the casing is provided with four channels or ports $d\ e\ f\ g$, all of them terminating at the seat 1 1 of the main valve. The openings of the four ports at the valve-seat are congruent segments of the sector of a circle arranged symmetrically, the openings $d$ and $e$, as well as $f$ and $g$, being diametrically opposite, while the center line of the ports $d$ and $e$ is at right angles to the center line of the ports $f$ and $g$. The channels $d$ and $e$ extend from the valve-seat vertically down, while the channels $f$ and $g$ are turned at right angles and lead away in opposite directions, as shown in Fig. 1. The fluid under pressure enters through the channel $d$, and the waste or exhaust fluid passes off through the channel $e$, while by the channels $f$ and $g$ communication is established between the main valve and the hydraulic apparatus, said channels, according to the position of the main valve, alternately serving for the supply and discharge of the liquid to and from the hydraulic apparatus.

$h$ is the main valve, arranged to turn on the center of the valve-face. Said valve is made cylindrical and provided with two segmental chambers $o$ and $p$, open at the face of the valve $a$, and its upper end is extended into an annular recess 2 of the upper part $c$ of the casing. The chamber $o$ is continuously over the supply port or channel $d$, the channel $p$ continuously over the discharge-port $e$, while in the position of rest the channels $f$ and $g$ are covered by the main valve and through the chambers $o$ and $p$ are alternately connected with the supply-port $d$ and the discharge-port $e$ in the working positions. Between the middle part $b$ of the casing and the valve $h$ is an annular space divided into four segmental spaces $m\ m$ and $n\ n$ by two diametrically-opposite abutments $i\ i$, projecting from the casing $b$ and provided with suitable packing to prevent leakage, and by two working pistons $k\ k$, projecting from valve $h$ and likewise provided with suitable packing. These parts—namely, the annular space, together with the pistons on the valve and the abutments on the casing—form a double oscillating piston-motor, which is actuated by water under pressure and turns the valve. The supply of water to the piston-motor and the discharge from the same are regulated by an auxiliary valve $w$.

$q$ and $r$ are channels passing through the main valve $h$, the channel $q$ connecting the diametrically-opposite chambers $m$, while the chambers $n$ are connected by the channel $r$. To the upper face of the valve $h$, Fig. 6, lead a vertical bore $s$ from the channel $q$ and a vertical bore $t$ from the channel $r$. Two vertical bores $u$ and $v$ are also provided in the main valve, of which the first one, $u$, passes up from the chamber $p$ and the other, $v$, up from the chamber $o$, Figs. 3 and 7. The bores $s$, $t$, and $u$ all terminate within the seat 3 of the auxiliary valve, which seat projects somewhat above the top surface of the main valve $h$, and are arranged concentrically on the valve-seat $s$ and $t$, being opposite each other, while the bore $u$ is at right angles to them. The bore $v$ is situated outside of the seat of the auxiliary valve $w$, which latter is situated within a chamber 4 of the upper part $c$ of the casing, and which chamber 4 is tightened by a packing 5 and kept filled with liquid through the port $d$, chamber $o$, and channel $v$, Fig. 3. The valve $w$ turns on the center of the seat 3, to which the valve is ground.

Like the main valve, the auxiliary valve is provided with sector-shaped chambers $x$ and $y$, Figs. 5, 7, 8, and 10, open at the bottom, the chamber $x$ being constantly connected to the pressure-chamber 4 of the upper part $c$ of the casing by a bore $z$. The second chamber $y$ is constantly above the bore $u$, so as to be in constant communication with the exhaust-space through the chamber $p$ and port $e$. The bores $s$ and $t$ are in the half-way position of the pistons $k$ $k$ both covered, Figs. 5 and 6, while in the working position these bores $s$ and $t$, and with them the chambers $m$ and $n$, are alternately connected through the chambers $x$ and $y$, the one with the pressure-chamber 4 and the other with the exhaust-chamber $p$. The auxiliary valve $w$ is turned by a rod engaging a slot on the top and passing through a stuffing-box in the top of the casing.

The operation of the apparatus is as follows: When the main valve and the auxiliary valve are in their middle or rest positions, as shown in Figs. 1 to 7, the ports or channels $f$ and $g$ are covered by the main valve $h$, Figs. 1 and 2, and the channels $s$ and $t$ are covered by the auxiliary valve $w$, Figs. 5 and 6, so that the liquid under pressure in the channel $d$, chamber $o$, and bore $v$, the chamber 4, the bore $z$, and the chamber $x$ can pass neither to the hydraulic apparatus nor into the pressure-chambers $m$ and $n$. When, however, the auxiliary valve is turned, for instance, to the left, as in Fig. 8, the bores $s$ and $t$ are uncovered, the liquid under pressure passes through $d$ $o$ $v$ and farther in the direction of the light-winged arrows in Fig. 8, and through the chamber 4, channels $z$ $x$ $t$ $r$ into the two chambers $n$, while the two chambers $m$ are connected to the exhaust-space through $q$ $s$ $y$ $u$ $p$ $e$. The pressure of the liquid within the chambers $n$, acting upon the pistons $k$, causes the same to move away from the abutments, thereby turning the main valve, while at the same time the liquid within the spaces $m$ escapes in the direction of the dark-winged arrows in Fig. 8. The main valve is turned in the same direction as the auxiliary valve was turned—that is, to the left—until it takes the position shown in Fig. 9, so that now the auxiliary valve reassumes its former position relatively to the main valve, as shown in Fig. 5. Consequently the openings of $s$ and $t$ are again covered by the auxiliary valve, the flow of liquid under pressure to the spaces $n$ is interrupted, and the main valve $h$ stands still. In this position of the main valve the connections between the channels $d$ and $g$ through the chamber $o$ and of the channels $f$ and $e$ through the channels $p$ are established and the pressure liquid and the waste pass through the valve in the direction of the arrows in Figs. 1, 3, and 9, where the light-winged arrows indicate the direction of the liquid under pressure and the dark-winged arrows the direction of the waste. When now the auxiliary valve is turned back into its original position and a little beyond it, then from the commencement of the turning the chamber $x$ passes over the bore $s$ and the chamber $y$ over the bores $t$ and $u$, so that the liquid under pressure now passes into the spaces $m$ and turns the main valve back to its original position, and a little beyond it, until it reaches the position previously occupied by the auxiliary valve. Now the channels $d$ and $f$ are connected by the chamber $o$, the channels $e$ and $g$ by the chamber $p$, and the flow of the liquid in the channels $f$ and $g$ is reversed from that indicated by the arrow in Fig. 1—that is, the hydraulic apparatus is reversed. Thus the motion of the main valve follows that of the auxiliary valve as to direction and angular throw.

In place of two pistons on the main valve one single piston may be used, and correspondingly but one chamber with one abutment in the middle part of the casing, which would not change the mode of action.

Of course my invention is applicable not only to four-way valves, but also to other oscillating slide-valves for hydraulic-pressure apparatus.

What I claim is—

1. A valve-gear for fluid-pressure apparatus embodying a cylindrical main valve oscillating on a valve-face at right angles to its axis and constructed with a piston or pistons projecting therefrom, a casing concentric to the main valve, leaving a space within which the piston oscillates, an abutment or abutments projecting from the casing to the main valve, these parts forming an oscillating fluid-pressure motor for turning the valve; in combination with an auxiliary hand-valve constructed to turn upon the main valve for regulating the admission to and discharge from the oscillating piston-motor, and suitable connecting-ports; by which means the main valve is caused to follow the motion of the auxiliary valve and the flow of the liquid is regulated, substantially as specified.

2. A valve-gear for liquid-pressure apparatus embodying a valve-casing with a valve seat and ports; a cylindrical slide-valve constructed to oscillate upon said valve-seat; a piston or pistons projecting from said valve to the cylindrical casing, an abutment or abutments projecting from the cylindrical casing to the valve, the piston or pistons, the abutment or abutments and the annular chamber between the casing and the valve forming the essential parts of a motor actuating the main valve; an auxiliary oscillating slide-valve seated upon the top of the main valve for regulating the flow of the liquid under pressure to and from said motor, suitable connecting channels or ports and means for turning the auxiliary valve by hand; by which means the main valve is caused to follow the motion of the auxiliary valve and the flow of the liquid regulated, substantially as described.

3. A valve-gear for fluid-pressure apparatus embodying a casing consisting of three parts bolted together, namely a lower part $a$ with a circular valve-seat 1, 1, four concentric ports, one for supplying liquid under pressure, two for alternately serving for the supply and discharge of the liquid to and from the hydrulic apparatus and one for the final discharge of the waste liquid; a middle substantially-cylindrical part $b$, and a cover $c$ forming a chamber for an auxiliary valve; a cylindrical valve $h$ resting upon the valve-seat of the part $a$ and pivoted to the inner periphery of the cover $c$, said cylindrical valve $h$ being of smaller diameter than the inner cylindrical surface of the part $b$ of the casing and provided with segmental recesses $o$ and $p$; a hydraulic oscillating motor for the main valve consisting essentially of a piston or pistons projecting from the valve to the cylindrical inner wall of the casing and an abutment or abutments projecting from the casing, the piston and abutment confined between the upper and lower part of the casing; an auxiliary oscillating slide-valve $w$ located within the upper part $c$ of the casing, resting upon a valve-seat upon the top of the main valve and pivoted to the main valve, a rod passing through a stuffing-box of the casing, by which rod the auxiliary valve $w$ is turned, and connecting-channels from the auxiliary valve to the main valve and thence to the motor, whereby the main valve is caused to follow the motion of the auxiliary valve, and the flow of liquid regulated, substantially as specified.

In testimony whereof I have hereunto set my hand in the presence of two subscribing witnesses.

JOHANNES KRONE.

Witnesses:
WM. ESSENWEIN,
EMIL HOETTE.